(12) United States Patent
Marchini et al.

(10) Patent No.: US 12,339,453 B2
(45) Date of Patent: Jun. 24, 2025

(54) OPTICAL SYSTEM FOR A VIRTUAL RETINAL SCAN DISPLAY, AND METHOD FOR PROJECTING IMAGE CONTENT ONTO A RETINA

(71) Applicant: Robert Bosch GmbH, Stuttgart (DE)

(72) Inventors: Andrea Marchini, Kusterdingen (DE); Andreas Petersen, Eningen (DE); Christian Nitschke, Kusterdingen (DE); Eva Lea Elisabeth Empting, Kuesnacht (CH); Gael Pilard, Wankheim (DE); Hendrik Specht, Pliezhausen (DE); Joerg Carls, Altdorf (DE); Johannes Hofmann, Tuebingen (DE); Maximilian Busch, Eningen Unter Achalm (DE); Sebastian Reiss, Reutlingen (DE); Simon Pick, Tuebingen (DE); Tadiyos Alemayehu, Pfullingen (DE); Thomas Kuenstle, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 654 days.

(21) Appl. No.: 17/672,909

(22) Filed: Feb. 16, 2022

(65) Prior Publication Data
US 2022/0269088 A1 Aug. 25, 2022

(30) Foreign Application Priority Data

Feb. 25, 2021 (DE) ................... 10 2021 104 528.2

(51) Int. Cl.
*G02B 27/01* (2006.01)
*G02B 27/00* (2006.01)

(52) U.S. Cl.
CPC ..... *G02B 27/0172* (2013.01); *G02B 27/0093* (2013.01); *G02B 2027/011* (2013.01);
(Continued)

(58) Field of Classification Search
None
See application file for complete search history.

(56) References Cited

U.S. PATENT DOCUMENTS

2009/0115968 A1* 5/2009 Sugiyama ............ G02B 27/017
351/221

FOREIGN PATENT DOCUMENTS

DE 102017211934 A1 1/2019

* cited by examiner

*Primary Examiner* — Bao-Luan Q Le
*Assistant Examiner* — Danell L Owens
(74) *Attorney, Agent, or Firm* — NORTON ROSE FULBRIGHT US LLP

(57) ABSTRACT

An optical system for a virtual retinal scan display. The optical system includes an image source which supplies image data, an image processing device for the image data, a projector unit having a light source modulatable in time for generating a light beam, and an actuable refraction device for the light beam for the scanning projection of the image content, a deflection unit onto which the image content is able to be projected and which is designed to guide the projected image content onto an eye of a user, and an adaptive optical element for modifying a beam divergence, which is situated in the optical path between the light source and the deflection unit. The adaptive optical element is able to be actuated so that the beam divergence of the light beam is variable as a function of the angle of incidence of the light beam on the deflection unit.

16 Claims, 3 Drawing Sheets

(52) U.S. Cl.
CPC ............... *G02B 2027/0147* (2013.01); *G02B 2027/0178* (2013.01)

OPTICAL SYSTEM FOR A VIRTUAL RETINAL SCAN DISPLAY, AND METHOD FOR PROJECTING IMAGE CONTENT ONTO A RETINA

CROSS REFERENCE

The present application claims the benefit under 35 U.S.C. § 119 of German Patent Application No. DE 10 2021 104 528.2 filed on Feb. 25, 2021, which is expressly incorporated herein by reference in its entirety.

BACKGROUND INFORMATION

Smart glasses that include a projector unit in which image contents can be guided onto a retina of an eye of a user by a scanning projection of light beams via a deflection unit are described in German Patent Application No. DE 10 2017 211 934 A1.

SUMMARY

The present invention includes an optical system for a virtual retinal scan display, which at least includes
a. an image source which supplies an image content in the form of image data,
b. an image processing device for the image data,
c. a projector unit having a light source able to be modulated in time for generating at least one light beam, and having a refraction device actuable in particular by the projector unit, for the at least one light beam for the scanning projection of the image content,
d. a deflection unit onto which the image content is able to be projected and which is designed to guide the projected image content, preferably at least a portion of the total intensity of the projected image content, onto an eye of a user,
e. an adaptive optical element for modifying a beam divergence, which is situated in the optical path of the light beam between the light source and the deflection unit.

In accordance with an example embodiment of the present invention, it is provided that the adaptive optical element is able to be actuated so that the beam divergence of the light beam is variable as a function of the angle of incidence of the light beam on the deflection unit.

A 'virtual retinal scan display' in particular should be understood as a retinal scan display or a light field display in which the image content is sequentially rasterized by refracting at least one light beam, in particular a laser beam of at least one time modulated light source, e.g., one or more laser diodes(s), and imaged directly onto the retina of the user eye by optical elements. The image source is particularly developed as an electronic image source such as a graphics output, in particular an (integrated) graphics card, of a computer or processor or the like. For instance, the image source may be integrally developed with the image processing device of the optical system. Alternatively, the image source may be developed separately from the image processing device and transmit image data to the image processing device of the optical system. The image data are particularly developed as color image data, e.g., RGB image data. More particularly, the image data may be developed as still images or moving images such as videos. The image processing device is preferably provided to modify the image data of the image source, in particular distort, copy, rotate, offset or scale, etc. the image data. The image processing device is preferably provided to generate copies of the image content, which especially are modified, e.g., distorted, rotated, offset and/or scaled, for example.

In particular, the projector unit is set up to radiate the image content of the image data in the form of scanned and/or rasterized light beams. The projector unit especially includes a refraction device, preferably a MEMS mirror (micromirror actuator), at least for the controlled refraction of at least one light beam of the light source of the projector unit. As an alternative or in addition, the refraction device includes at least one switchable diffractive optical element in the form of a phase modulator and/or an intensity modulator which, for example, may be embodied as a spatial light modulator (SLM) having a reflective design, e.g., a DMD or LCoS development, or a transmissive development, e.g., in the form of an LCD. In particular, the time modulatable light source is modulated in an analog fashion, but an alternative TTL modulation, for instance, is not excluded.

The deflection unit in particular includes a system of optical elements, e.g., diffractive, reflective, refractive and/or holographic optical elements. However, the deflection unit preferably always includes at least one holographic optical element. The deflection unit is at least partly integrated into a lens of smart glasses. The deflection unit is particularly provided to deflect only a portion of the intensity of the projected image contents onto the user eye. At least one further portion of the projected image contents passes through the deflection unit. The deflection unit appears to be essentially transparent to a user, at least when viewed from a perpendicular viewing angle. More particularly, the deflection unit forms a projection area. The projection area especially forms an area within which a light beam is refracted/deflected in the direction of the user eye, in particular in the direction of an eye pupil area of the optical system, when the light beam impinges upon the deflection unit. 'Provided' and/or 'designed' should particularly be understood as specially programmed, configured and/or equipped. The statement that an object is provided and/or designed for a particular function in particular means that the object satisfies and/or executes this certain function in at least one application and/or operating state.

In particular, in accordance with an example embodiment of the present invention, the adaptive optical element is provided to dynamically vary the beam divergence of the at least one light beam as a function of the instantaneous angle of incidence of the light beam on the deflection unit in an operating state of the optical system, that is, during a scanning projection of the image content in the form of at least one light beam. Possible although not limited thereto would be that the adaptive optical element includes at least one varifocal lens. For instance, without being restricted to such an embodiment, the varifocal lens could be developed as a two-phase liquid lens, in particular having an electrically adjustable contact angle for the control of a liquid meniscus of the liquid lens. As an alternative or in addition, the varifocal lens could be developed as a diaphragm-based liquid lens in which in particular a diaphragm of the liquid lens is deformable by the pressure of a liquid. Alternatively or additionally, the varifocal lens may be developed as a deformable glass-polymer stack having a piezo actuator system.

More specifically, in accordance with an example embodiment of the present invention, the adaptive optical element is provided to place a focus of the at least one light beam on a focal plane of the deflection unit by varying the beam divergence of the at least one light beam. In particular due to the scanned projection, that is to say, especially as a function of an angle of incidence of the light beam on the deflection unit, paths of different lengths arise starting from the projector unit and leading to the deflection unit, in particular to the focal plane of the deflection unit. It is conceivable that the optical system includes an open-loop or a closed-loop control unit for actuating the adaptive optical element. An 'open-loop or closed-loop control unit' especially is to be understood as a unit having at least a control electronics. A 'control electronics' in particular describes a unit provided with a processor unit and a memory unit as well as an operating program stored in the memory unit. In particular, the open-loop or closed-loop control unit may be developed inside the smart glasses, e.g., integrated into a side piece of the smart glasses, or be developed separately from the smart glasses, e.g., as part of an external device allocated to the optical system such as a smartphone. It is furthermore conceivable that the open-loop and/or closed-loop control unit is at least partially developed in one piece with the image processing unit or the projector unit. The statement that two units are 'partially developed in one piece' especially means that the units have at least one, especially two, and advantageously at least three shared elements which are a component of both units, especially a functionally important component. Because of a dynamic adaptation, in particular variation, of the beam divergence of the light beam by the adaptive optical element as a function of the angle of incidence of the light beam on the deflection unit, it is particularly possible to compensate for different path lengths starting from the projector unit up to the focal plane of the deflection unit. More specifically, it is conceivable that the adaptive optical element is actuated and/or controlled, preferably online and/or virtually in real time, based on the current measuring results of a variable environment situation, e.g., based on measuring results of an eye tracker or a similar device.

The embodiment of the optical system according to the present invention advantageously makes it possible to achieve an improved functionality of the virtual retinal scan display. An especially large effective total eye box is achievable, which in particular simultaneously has the largest possible visual field. In this context, an 'effective total eye box' describes a spatial area at pupil positions of a user eye in which the entire image content of an output image from at least one exit pupil of the virtual retinal scan display runs through the pupil of the user eye. In particular, such an embodiment achieves an advantageous image quality, especially an advantageous image sharpness, in an advantageously large area of the effective total eye box. Moreover, an especially high tolerance with regard to eye movements and/or with regard to slipping of smart glasses having the display device is able to be achieved. Such an embodiment especially makes it possible to obtain a high image quality, in particular a high image sharpness, regardless of eye movements and/or regardless of slipping of the smart glasses including the display device. More specifically, a larger area of especially a holographic combiner optics is able to be utilized by such an embodiment, it being possible to adapt the focus, in particular. An advantageous image quality, in particular a high image sharpness, is obtainable in this way despite utilizing a larger area of especially the holographic combiner optics. In an advantageous manner, this makes it possible to achieve an especially comfortable use of the smart glasses having the display device. More specifically, such an embodiment obtains better characteristics as far as a personalization capability is concerned because an image sharpness is adaptable in particular to possible characteristics of a user eye. More specifically, a high image resolution with an advantageous image sharpness can be ensured. Such an embodiment especially makes it possible to adapt the focus of an individual light beam. Such an embodiment particularly allows for a dynamic adaptation of the focus of an individual light beam, that is to say, adaptive to changing visual acuities or different accommodation distances.

In accordance with an example embodiment of the present invention, it is furthermore provided that the adaptive optical element is able to be synchronized with the refraction device of the projector unit so that the beam divergence of the light beam is variable as a function of the refraction of the light beam. In particular, via the projector control unit, the adaptive optical element is connected to the refraction device of the projector unit for a data exchange so that an adaptation of the beam divergence of the light beam as a function of the angle of incidence of the light beam on the deflection unit is realizable. For instance, it would be conceivable that the projector control unit actuates the refraction device of the projector unit and the adaptive optical element in a synchronized manner. An advantageous image sharpness, in particular, is achievable by such an embodiment.

In accordance with an example embodiment of the present invention, it is furthermore provided that the refraction device of the projector unit is set up to refract the light beam more slowly in the horizontal direction than in the vertical direction so that the image content is projected in a column-wise manner, and the adaptive optical element is synchronized with the horizontal refraction of the light beam. The refraction device of the projector unit is then preferably set up to refract the light beam more slowly in the horizontal direction than in the vertical direction so that the image content is projected in a column-wise manner, in particular when the projector unit is situated in a sidepiece of smart glasses and thus in particular laterally to a lens of the smart glasses and therefore especially laterally to the deflection unit. Such an embodiment ensures that the varying of the beam divergence with the aid of the adaptive optical element with its limited dynamics is able to follow the horizontal refraction of the light beam with a resulting further improvement of the image sharpness.

In accordance with an example embodiment of the present invention, it is moreover provided that the refraction device of the projector unit is set up to deflect the light beam more slowly in the vertical direction than in the horizontal direction so that the image content is projected in a line-wise manner, and the adaptive optical element is synchronized with the vertical refraction of the light beam. The refraction device of the projector unit is then preferably set up to refract the light beam more slowly in the vertical direction than in the horizontal direction so that the image content is projected in a line-wise manner especially when the projector unit is situated below or above a lens of the smart glasses and thus in particular below or above the deflection unit. Such a placement of the projector unit below or above the lens of the smart glasses, and especially with a line-wise projection of the image contents in which the adaptive optical element is synchronized with the vertical refraction of the light beam especially is used in smart glasses that are developed as gaming glasses. Such an embodiment makes it possible to ensure that the variation of the beam divergence with the aid of the adaptive optical element with its limited dynamics is able to follow the vertical refraction of the light beam so that an image sharpness is able to be further improved.

In addition, in accordance with an example embodiment of the present invention, an eye tracker device for acquiring and/or determining an eye state of the user is provided, in particular for acquiring and/or determining an eye movement, an eye movement rate, a pupil position, a pupil size, a viewing direction, an accommodation state and/or a fixation distance of the eye, and the adaptive optical element is actuable in such a way that the current eye state of the user is taken into account in the variation of the beam divergence of the light beam. The optical system in particular includes the eye tracker device. The eye tracker device is preferably at least partially integrated into a component of the smart glasses, e.g., into a frame of the smart glasses. More particularly, the eye tracker device is developed as a component of the virtual retinal scan display, in particular of the optical system. Detailed embodiments of eye trackers are available in the related art and will therefore not be discussed in greater detail in this context. It is conceivable that the eye tracker device includes a monocular or a binocular eye tracking system, and at least the binocular eye tracking system is especially set up to derive a fixation distance from oppositely directed eye movements (vergence). As an alternative or in addition, the eye tracker device includes an eye tracking system provided with a depth sensor for ascertaining a focal point in the environment for ascertaining the fixation distance. The open-loop or closed-loop control unit and/or the image processing unit is/are especially provided to consider the current eye state of the user in the actuation of the adaptive optical element for the variation of the beam divergence of the light beam. This advantageously achieves an improved functionality of the virtual retinal scan display. In an advantageous manner, a particularly user-friendly virtual retinal scan display is achievable which performs an adaptation of the images that the user is unable to notice so that the user is able to experience the most homogeneous and especially sharp image impression possible.

In addition, in accordance with an example embodiment of the present invention, at least one sensor module is provided for determining context information, in particular for determining a head posture, a head orientation and a head movement of the user, for determining a brightness of the environment and light conditions, for determining a location and for determining a movement situation of the user, and the adaptive optical element is able to be actuated in such a way that the currently determined context information is taken into account in the variation of the beam divergence of the light beam. It would be conceivable that the sensor module includes one or more sensor(s) for an indirect, in particular context-dependent, ascertainment of the most likely accommodation state of the user eye, e.g., sensors an ascertaining a head posture, GPS sensors, acceleration sensors, chronometers and/or brightness sensors or the like. In particular, the optical system includes the sensor module. The sensor module is preferably at least partly integrated into a component of the smart glasses such as in a frame of the smart glasses. This advantageously achieves a better functionality of the virtual retinal scan display. In an advantageous manner, an especially user-friendly virtual retinal scan display is achievable, which performs an adaptation of the images that a user is unable to notice so that the user is able to experience the most homogeneous and especially sharp image impression possible. Such an embodiment in particular could make it possible to dispense with an eye tracker device, which increases the cost efficiency.

In accordance with an example embodiment of the present invention, it is furthermore provided that the adaptive optical element is actuable in such a way that a defective vision and/or a defective accommodation of the user is/are taken into account in the variation of the beam divergence of the light beam and compensated for at least partially and especially fully. This advantageously achieves an improved functionality of the virtual retinal scan display. In an advantageous manner, the virtual retinal scan display can be used regardless of a visual acuity and/or regardless of further visual acuity-correcting devices such as contact lenses. More particularly, the virtual retinal scan display includes a functionality for a visual acuity correction of the virtual image contents. In particular, given defective vision, individual light beams from individual exit pupils are focused in front of (myopia) or behind (hyperopia) the retina of the user eye, which is compensated for by varying the beam divergence of the individual light beam with the aid of the adaptive optical element. When correcting a defective vision and/or a defective accommodation of the user, an angle, in particular an angle deviation, from the individual light beam to a light beam transporting the same image information from another exit pupil is adapted in addition, for instance for the correction of a myopia, so that a point of intersection of the individual beams is created at a suitable distance in front of the eye. The adaptation of the angle deviation between the individual beams in particular takes place simultaneously by changing the sub-image data. More particularly, the optical system encompasses a functionality for an accommodation correction of the displayed image contents. By taking the defective accommodation of the user into account in the variation of the beam divergence of the light beam with the aid of the adaptive optical element, the virtual retinal scan display is able to be utilized at least essentially independently of an accommodation of the user eye. Especially in a near accommodation of the user eye (curvature of the eye lens: increase in the refraction of the eye lens), parallel beams with the same image contents from the individual exit pupils are focused in front of the retina of the user eye (similar to myopia), which is compensated for by a variation of the beam divergence of the light beam by the adaptive optical element and also by an adaptation of the sub-image data. The accommodation state and/or the defective vision of the user eyes may especially be adjusted manually (e.g., using a switch on the smart glasses) or be ascertained automatically, in particular directly by the eye tracker device and/or in particular indirectly by the sensor module, and then transmitted to the open-loop or closed-loop control unit and/or the image processing device. A manual adjustment of the accommodation state is able to be performed by switching between discrete distances (near/far), by context profiles (workplace, indoor, outdoor, means of transport, sports, etc.) and/or by setting a continual distance range (e.g., via a slider interaction element in an app associated with the optical system).

In addition, at least one interface is provided for the manual input of context information and/or information pertaining to a defective vision and/or a defective accommodation of the user. The optical system particularly includes an input function, which is realized via the interface and which makes it possible to input context information and/or information pertaining to a defective vision and/or a defective accommodation of the user. In particular, based on adjusted context information and/or the information about a defective visual and/or defective accommodation of the user, the consequently required correction, in particular the required variation of the beam divergence of the light beam by the adaptive optical element, is taken into account in the actuation of the adaptive optical element by the open-loop or closed-loop control unit and/or by the image processing device. The interface particularly has at least one data communications link, preferably to an external device. The external device is developed especially as a device external to the smart glasses. In particular, the external device is embodied as a computer. In particular, but without being limited thereto, the external device could be embodied as a mobile telephone, a smartphone, a tablet computer and/or as a notebook. It would be conceivable, for example, that the external device has at least one application by which the user is able to make inputs of context information and/or inputs pertaining to a defective vision and/or a defective accommodation of the user. The data communications link, for instance, could be a wired connection. The data communications link preferably has a wireless development, e.g., via WLAN and/or via Bluetooth, Bluetooth low energy, or the like, but it is not restricted thereto. For instance, such an embodiment particularly achieves a high user comfort. More particularly, an especially advantageous adaptability to the user can be ensured. A comfortable input option of context information and/or information about a defective vision and/or defective accommodation of the user may particularly be provided in addition.

Moreover, in accordance with an example embodiment of the present invention, it is provided that the image processing device is set up to generate from the image data of the image source sub-image data which allow for a simultaneous projection of N×M sub-images having essentially the same image content; that an optical segmentation unit having at least one segmentation element is situated between the projector unit and the deflection unit, which performs a spatial segmentation in that essentially the same image content of the N×M sub-images is projected onto the deflection unit via at least two different imaging paths; and that the optical segmentation device is set up to project a first subset of the sub-images with a first scan direction onto the deflection unit, and to project a second subset of the sub-images with a second scan direction counter to the first scan direction onto the deflection unit so that the beam divergence of the light beam is continuously variable with the aid of the adaptive optical element as a function of the angle of incidence of the light beam on the deflection unit. The sub-image data especially include copies or (distorted, offset, rotated or otherwise scaled) versions of the image contents. In particular, the sub-image data in this case include N*M sub-images. The expression 'essentially the same image content' is especially meant to denote an identical image content in comparison with the image content to be displayed, with the exception of the modifications of the individual sub-images performed to compensate for the distortions generated by the optical elements of the optical system. In this context, N is especially a whole number greater than or equal to 1. M in this context is especially a whole number greater than or equal to 1. The image processing device is particularly designed to generate sub-image data that include multiple, simultaneously displayed sub-images in each case, each one of the sub-images of the sub-image data being separately modified for different imaging paths. In particular, each sub-image of the sub-image data is projected onto the projection area of the deflection unit via a different (dedicated) imaging path of the individually actuable imaging paths. The optical segmentation unit has at least one optical segmentation element, which is developed as a segmenting lens, for instance. The optical segmentation unit, in particular the optical segmenting element, is preferably situated in an optical path of the scanned light beam between the refraction device of the projector unit and the deflection unit. The optical segmentation element particularly is embodied as a spatially segmented optical element, which especially is provided to image/ deflect a spatial segmentation of individual sub-images of the images in a spatially separated manner. A 'spatial segmentation' of an image in particular is meant to describe a separation of the image into a plurality of individual or sub-images situated spatially separated from one another in an image plane, especially next to and/or on top of one another, the individual or sub-images preferably including copies or versions of the image content. A 'copy of the image content' should specifically be understood as an exact or virtually exact image of the respective image content. A 'version of the image content' especially means a modified, in particular at least distorted, offset, rotated or otherwise scaled imaging of the image content. In particular, the exit pupils are situated without overlap with respect to one another. The optical segmentation unit is particularly provided to generate a plurality of different imaging paths. More specifically, the optical segmentation unit is provided to generate a number of different imaging paths that corresponds to a number of segmentations/segments of the optical segmentation unit, especially the optical segmentation element of the optical segmentation unit. After a deflection by the deflection unit, each one of the different imaging paths terminates in/passes through an exit pupil which is situated separate from all other exit pupils. In particular, the light beams of each imaging path are deflected within subregions of the projection area which differ from one another (and possibly partially overlap). It is conceivable that the optical system has an open-loop or closed-loop control unit for the individual actuation of the imaging paths. Especially when the projector unit, in particular the refraction unit, guides the sub-images along one direction onto the optical segmentation unit, the optical segmentation unit projects a first subset of the sub-images with a first scan direction onto the deflection unit and projects a second subset of the sub-images with a second scan direction counter to the first scan direction onto the deflection unit. The beam divergence of the light beam is variable, in particular continuously, with the aid of the adaptive optical element as a function of the angle of incidence of the light beam on the deflection unit. Because the optical segmentation unit projects a first subset of the sub-images with a first scan direction onto the deflection unit and a second subset of the sub-images with a second scan direction counter to the first scan direction onto the deflection unit, abrupt changes in the variation of the beam divergence of the light beam that would otherwise be necessary in order to generate a sharp image are advantageously able to be avoided. A sharp image, in particular, is ensurable in this way.

In accordance with an example embodiment of the present invention, it is furthermore provided that the optical function of projecting a first subset of the sub-images with a first scan direction onto the deflection unit and of projecting a second subset of the sub-images with a second scan direction counter to the first scan direction onto the deflection unit is integrated into the at least one segmentation element and/or into at least one optical element which is connected upstream and/or downstream from the at least one segmentation element in the optical path. Especially when the optical function of projecting the first subset of the sub-images with the first scan direction onto the deflection unit and the second subset of the sub-images with the second scan direction counter to the first scan direction onto the deflection unit is integrated into the at least one optical segmentation element, it would be conceivable that the at least one optical segmentation element fully forms the optical segmentation unit. As an alternative thereto, it would be conceivable that the optical segmentation unit includes not only the optical segmentation unit but also at least one optical element, which is connected upstream and/or downstream from the at least one segmentation element in the optical path. The at least one optical element is preferably connected directly upstream and/or downstream from the at least one segmentation element in the optical path. Such an embodiment makes is possible to achieve advantageous characteristics with regard to an image quality, in particular with regard to an image impression, and advantageously with regard to an image sharpness. More specifically, better characteristics are achievable with regard to an optical resolution and/or with regard to a homogeneity of an optical resolution. In addition, such an embodiment particularly makes it possible to provide improved characteristics as far as a manufacturability and/or an integrability is/are concerned.

In addition, in accordance with an example embodiment of the present invention, the optical system includes smart glasses having a frame and lenses, and the at least one projector unit is situated on the frame of the smart glasses and the at least one deflection unit is situated in the region of at least one lens, in particular is integrated into at least one lens of the smart glasses. It would furthermore be conceivable that the at least one segmentation element is situated on the frame of the smart glasses. This makes it possible to achieve an advantageous embodiment of the smart glasses and/or an advantageous integration of the virtual retinal scan display. In particular, the smart glasses may also include more than one projector unit, more than one segmentation element and/or more than one deflection element, e.g., one for each lens of the smart glasses. It would be possible that the image source together with the image processing device is situated in an external device and that the sub-image data are transmitted from the external device to the projector unit of the smart glasses.

An example embodiment of the present invention furthermore starts out from a method for projecting image contents onto the retina of a user with the aid of an optical system which at least includes a. an image source which supplies an image content in the form of image data,
b. an image processing device for the image data,
c. a projector unit having a light source able to be modulated in time for generating at least one light beam, and including an actuable refraction device for the at least one light beam for the scanning projection of the image content,
d. a deflection unit onto which the image content is projected and which guides the projected image content onto an eye of a user,
e. an actuable adaptive optical element for modifying the beam divergence, which is situated in the optical path of the light beam between the light source and the deflection unit.

In accordance with an example embodiment of the present invention, it is provided that a beam divergence of the light beam is varied with the aid of the actuable adaptive optical element as a function of the angle of incidence of the light beam on the deflection unit.

In accordance with an example embodiment of the present invention, it is furthermore provided that the adaptive optical element is synchronized with the refraction device of the projector unit so that the beam divergence of the light beam is varied as a function of the refraction of the light beam, in particular as a function of the horizontal refraction of the light beam. In particular, the adaptive optical element is connected via the projector control unit to the refraction device of the projector unit for a data exchange so that an adaptation of the beam divergence of the light beam as a function of the angle of incidence of the light beam on the deflection unit is realized by a synchronization with the refraction device of the projector unit. Such an embodiment makes it possible to achieve an advantageous image sharpness, in particular.

In addition, it is provided that information about an eye state of the user and/or context information is determined and that the adaptive optical element is actuated in such a way that the current eye state of the user and/or the currently determined context information is/are taken into account in the variation of the beam divergence of the light beam. The information about the eye state of the user and/or the context information is advantageously determined by the sensor module and/or by the eye tracker device and transmitted to the open-loop or closed-loop control unit, in particular. The open-loop or closed-loop control unit actuate(s) the adaptive optical element, for which the current eye state of the user and/or the currently determined context information is/are taken into account in the variation of the beam divergence of the light beam. Such an embodiment especially makes it possible to achieve an advantageous image sharpness. More particularly, such an embodiment allows for an optimal adjustment of an image sharpness especially for the respective exit pupil and in particular in the area of the visual field that best matches the current eye state, in particular the current eye pupil position and/or the current viewing direction. More particularly, an especially high user comfort is achievable with the aid of such an embodiment.

The optical system according to the present invention and the method according to the present invention are not meant to be restricted to the afore-described uses and embodiments. More particularly, to satisfy a method of functioning described herein, the optical system according to the present invention and the method according to the present invention may have a number of individual elements, components and units as well as method steps that deviates from the number mentioned herein. In addition, the value ranges indicated in this disclosure are meant to include as disclosed also values that lie within the mentioned limits and which may be used in a variety of ways.

BRIEF DESCRIPTION OF THE DRAWINGS

Additional advantages result from the following description of the figures. The figures show two exemplary embodiments of the present invention. The figures and the description herein include numerous features in combination. One skilled in the art will also examine the features in isolation and expediently combine them to form further meaningful combinations, in view of the disclosure herein.

DETAILED DESCRIPTION OF EXAMPLE EMBODIMENTS

Figure 1:
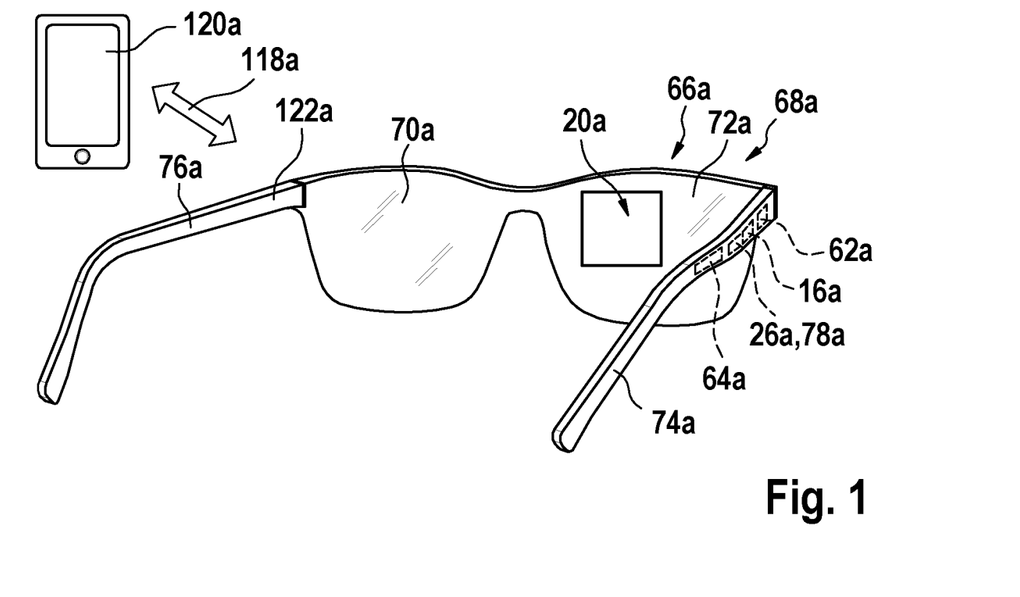
FIG. 1 shows a schematic representation of smart glasses of an optical system, in accordance with an example embodiment of the present invention.

FIG. 1 shows a schematic representation of an optical system 68a including smart glasses 66a. Smart glasses 66a have lenses 70a, 72a. Lenses 70a, 72a are mostly transparent. Smart glasses 66a have a frame 122a including side pieces 74a, 76a. Smart glasses 66a form part of optical system 68a. In the case illustrated in FIG. 1, optical system 68a includes an external device 120a. External device 120a is developed as a smartphone by way of example. External device 120a is in a data communications connection 118a with smart glasses 66a. Alternatively, smart glasses 66a may also fully form optical system 68a. Optical system 68a is provided to form a virtual retinal scan display. In the example illustrated in FIG. 1, smart glasses 66a have a processing unit 78a. Processing unit 78a is integrated into one of side pieces 74a, 76a of the smart glasses. Alternative placements of processing unit 78a in smart glasses 66a, e.g., in a lens edge, are also conceivable. In particular, a 'processing unit 78a' is to be understood as a controller provided with a processor, a memory unit and/or an operating, control and/or calculation program stored in the memory unit. Processing unit 78a is provided for an operation of smart glasses 66a, in particular of individual components of smart glasses 66a.

Figure 2:
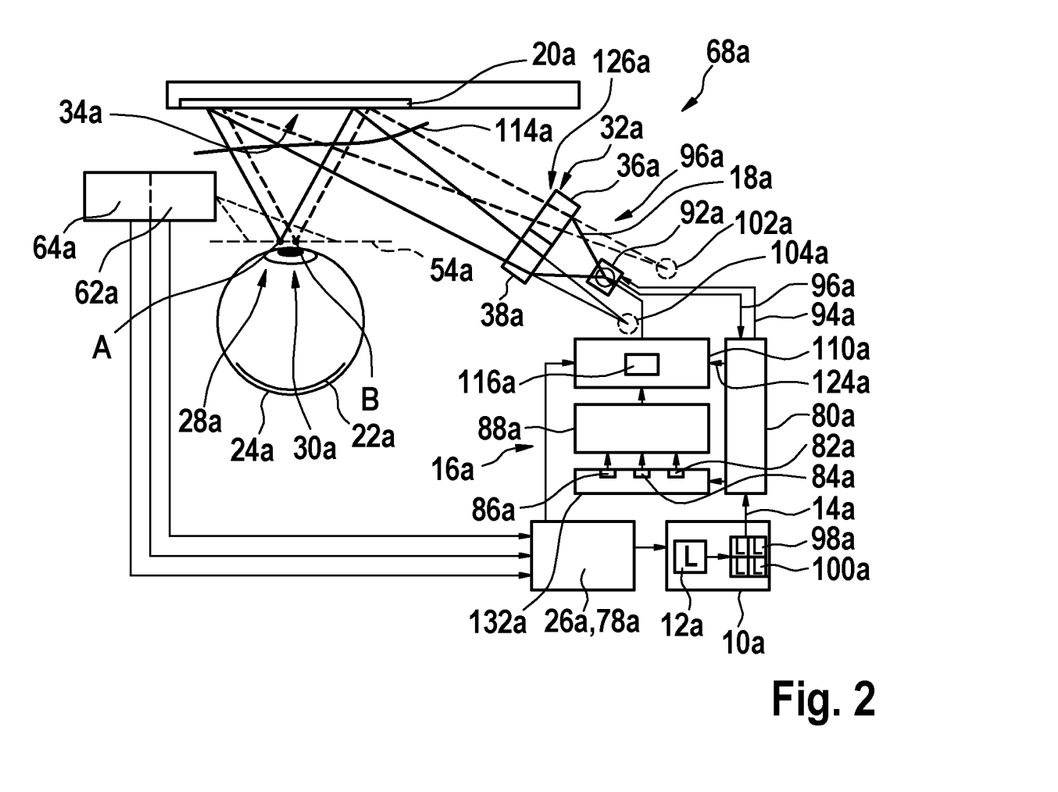
FIG. 2 shows a schematic representation of the optical system, in accordance with an example embodiment of the present invention.

FIG. 2 shows a schematic representation of a part of optical system 68a. Optical system 68a has an image source. The image source supplies an image content in the form of image data 12a. The image source may be an integral part of smart glasses 66a. As an alternative, the image source may also be embodied as external device 120a or as part of external device 120a. Optical system 68a has an image processing device 10a. Image processing device 10a is provided for the digital receiving of image data 12a and/or for a direct generation of image data 12a. Image processing device 10a is provided for the digital image processing of image data 12a. Image processing device 10a is provided for a modification of image data 12a. For instance, image data 12a may form a still image or a video feed. Image processing device 10a may partially be developed in one piece with processing unit 78a. Image processing device 10a is designed to convert image data 12a into sub-image data 14a. In the exemplary embodiment shown in FIG. 2, image processing device 10a converts image data 12a into sub-image data 14a, which include a plurality of sub-images 98a, 100a generated on the basis of the original image content. In this case, image processing device 10a is designed to generate and output a matrix-type array of sub-images 98a, 100a within sub-image data 14a, in particular to a projector unit 16a of optical system 68a.

Optical system 68a has projector unit 16a. Projector unit 16a receives the sub-image data 14a from image processing device 10a. Projector unit 16a is embodied as a laser projector unit. Projector unit 16a is configured for the emitting of the sub-image data 14a in the form of light beams 18a. Light beams 18a are developed as scanned laser beams. During each pass through a scanning area of projector unit 16a, the scanned laser beams generate images of all sub-images 98a, 100a of sub-image data 14a. Projector unit 16a includes a projector control unit 80a.

Projector unit 16a includes a light source 132a able to be modulated in time. Time modulatable light source 132a is designed to generate light beams 18a. Projector control unit 80a is designed to control or regulate the generation and/or modulation of light beams 18a by light source 132a. In the illustrated exemplary embodiment, light source 132a includes three laser diodes 82a, 84a, 86a (able to be modulated in their amplitudes). A first laser diode 82a generates a red laser beam. A second laser diode 84a generates a green laser beam. A third laser diode 86a generates a blue laser beam.

Projector unit 16a has a beam combining and/or beam forming unit 88a. Beam combining and/or beam forming unit 88a is/are designed to combine, in particular mix, the laser beams of different colors of laser diodes 82a, 84a, 86a in order to form a color image. Beam combining and/or beam forming unit 88a is/are designed to form light beam 18a, in particular the laser beam, that exits from projector unit 16a. Details regarding the development of beam combining and/or beam forming unit 88a are available in the related art.

Projector unit 16a includes at least one actuable refraction device 92a. Actuable refraction device 92a includes at least one MEMS mirror. It would be conceivable that actuable refraction device 92a has a plurality of MEMS mirrors, preferably two MEMS mirrors. In addition, it would be conceivable that actuable refraction device 92a includes at least one additional optical element such as at least one prism and/or at least one static mirror for the incoupling and/or outcoupling of the light beam. The MEMS mirror is part of a micromirror actuator (not shown). Actuable refraction device 92a is set up for a controlled refraction of the laser beam which generates a raster image. Details with regard to the development of the micromirror actuator are available in the related art. Projector unit 80a is designed for an open-loop or closed-loop control of a movement of actuable refraction device 92a (see arrow 94a). Actuable refraction control unit 92a regularly sends its actual position signals back to projector unit 80a (see arrow 96a).

Optical system 68a has a deflection unit 20a. The image content is able to be projected onto deflection unit 20a. Deflection unit 20a is designed to guide the projected image content onto a user eye 24a. Deflection unit 20a forms a projection area 34a. Light beams 18a impinging upon deflection unit 20a within projection area 34a are at least partially deflected/projected in the direction of user eye 24a. Deflection unit 20a is designed to influence (refract, disperse and/or reflect) light beams 18a in such a way that at least a portion of light beams 18a, preferably at least one sub-image 98a, 100a generated from image data 12a, is imaged on an eye pupil area 54a of optical system 68a, in particular on a retina 22a of user eye 24a. Optical system 68a is designed to form a plurality of exit pupils A, B using different optical elements. Optical system 68a is designed to influence light beams 18a with the aid of the different optical elements in such a way that the generated exit pupils (eye boxes) A, B are situated at a distance from one another. Optical system 68a forms eye pupil area 54a. Exit pupils A, B all lie next to and/or on top of one another in eye pupil area 54a. Eye pupil area 54a is developed as an area in space provided for the positioning of user eye 24a (within smart glasses 66a), in particular for the positioning of entry pupils of user eye 24a (within smart glasses 66a). Eye pupil area 54a is preferably flat but deviates from a perfect plane by slight curvatures.

Optical system 68a includes at least one adaptive optical element 116a. Adaptive optical element 116a is provided to modify a beam divergence. Adaptive optical element 116a is disposed in the optical path of the light beam between light source 82a, 84a, 86a and deflection unit 20a. Adaptive optical element 116a is provided to adapt a beam divergence of light beam 18a, in particular the laser beam, exiting from projector unit 16a, preferably to a path length of the respective currently emitted light beam 18a, especially as a function of the positioning of optical elements of optical system 68a. The beam divergence of light beams 18a, in particular laser beams, exiting from projector unit 16a is preferably adapted in such a way that a focus of the light beams 18a, in particular laser beams, exiting from projector unit 16a lies in a focal plane 114a of deflection unit 20a prior to impinging upon deflection unit 20a.

Adaptive optical element 116a is actuatable so that the beam divergence of the light beam is variable as a function of an angle of incidence of the respective light beam on deflection unit 20a. In the present exemplary embodiment, adaptive optical element 116a is able to be synchronized with refraction device 92a of projector unit 16a so that the beam divergence of the light beam is variable as a function of the refraction of the light beam. In the present exemplary embodiment, refraction device 92a of projector unit 16a is designed to refract the light beam more slowly in a horizontal direction than in a vertical direction so that the image content is projected in a column-wise manner, and adaptive optical element 116a is synchronized with the horizontal refraction of the light beam.

Optical system 68a has an electronic open-loop or closed-loop control unit 26a. Open-loop or closed-loop control unit 26a may partly be developed in one piece with processing unit 78a. Open-loop or closed-loop control unit 26a shown in FIG. 2 by way of example is provided for an actuation of adaptive optical element 116a and especially of image processing device 10a. In particular when adaptive optical element 116a is synchronized with refraction device 92a of projector unit 16a, a projector unit 80a of optical system 68a alternatively or additionally actuates adaptive optical element 116a, i.e., in particular in real time using respective refraction parameters of refraction device 92a. In FIG. 2, an arrow 124a shows the actuation of adaptive optical element 116a by projector control unit 80a.

Optical system 68a is designed to form a plurality of exit pupils A, B with the aid of different optical elements. Optical system 68a is developed to influence light beams 18a by the different optical elements in such a way that the generated exit pupils (eye boxes) A, B are generated at a distance from one another. Optical system 68a forms eye pupil area 54a. Exit pupils A, B are all situated next to and/or on top of one another in eye pupil area 54a. Eye pupil area 54a is developed as an area in space that is provided for the placement of user eye 24a (within smart glasses 66a), in particular for the placement of entry pupils of user eye 24a (within smart glasses 66a). Eye pupil area 54a is preferably flat but deviates from a perfect plane by slight curvatures. Eye pupil area 54a may approximately be considered/referred to as an eye pupil plane. Eye pupil area 54a is located in front of lenses 70a, 72a of smart glasses 66a in a viewing direction of the user and extends at least essentially parallel to a lens plane of lenses 70a, 72a of the smart glasses. More specifically, the expression 'essentially parallel' in this case should be understood to mean that deviations of up to 20° from a perfect plane are also included therein (keyword: facial wrap and pantoscopic tilt of lenses 70a, 72a).

Optical system 68a has an eye tracker device 62a. Eye tracker device 62a is integrated into a side piece 74a, 76a of the glasses (see FIG. 1). Alternative placements of eye tracker device 62a are conceivable. Eye tracker device 62a is designed to acquire and/or determine an eye state of the user. Eye tracker device 62a is designed to acquire and/or determine an eye movement of the user. Eye tracker device 62a is designed to acquire and/or determine an eye movement rate of the user. Eye tracker device 62a is designed to acquire and/or determine a pupil position of the user. Eye tracker device 62a is designed to acquire and/or determine a pupil size of the user. Eye tracker device 62a is designed to acquire and/or determine a viewing direction of the user. Eye tracker device 62a is designed to acquire and/or determine an accommodation state of the user. Eye tracker device 62a is designed to acquire and/or determine a fixation distance of the user. In this context it is of course conceivable that eye tracker device 62a tracks and/or monitors only a portion of the previously mentioned parameters and/or that eye tracker device 62a tracks and/or records still further parameters of the user or the environment of the user. In particular, a dedicated sensor hardware of eye tracker device 62a may be provided to acquire the accommodation state of user eyes 24a. Adaptive optical element 116a is actuable in such a way that the current eye state of the user is taken into account in the variation of the beam divergence of the light beam.

Optical system 68a has at least one sensor module 64a. Sensor module 64a is integrated into one of side pieces 74a, 76a of the smart glasses (see FIG. 1). Alternative placements of sensor module 64a are conceivable. Sensor module 64a is provided to acquire and/or determine context information. Sensor module 64a is provided to acquire and/or determine a head posture. Sensor module 64a is provided to acquire and/or determine a head movement and/or a head orientation. Sensor module 64a is provided to acquire and/or determine an environment brightness and/or light conditions. Sensor module 64a is provided to acquire and/or determine a location of the user. Sensor module 64a is provided to acquire and/or determine a movement situation of the user. In particular, sensor module 64a is provided to acquire and/or consider sensor data such as, but not restricted to, a head posture, a rate of rotation, an acceleration, GPS data or also the currently displayed image content. It would also be conceivable that an eye movement, an eye movement rate, a pupil position, a pupil size, a viewing direction, an accommodation state and/or a fixation distance of the eye is/are derivable from the sensor data acquired by sensor module 64a, i.e., in particular with the aid of processing unit 78a. Also conceivable would be an optical system 68a which has an eye tracker device 62a or a sensor module 64a.

Adaptive optical element 116a is able to be actuated in such a way that the currently determined context information may be taken into account in the variation of the beam divergence of the light beam. Adaptive optical element 116a can be actuated so that a defective vision or a defective accommodation of the user is considered in the variation of the beam divergence of the light beam and be compensated for at least partially and preferably completely. The optical system furthermore includes at least one interface for the manual input of context information and/or information about a defective vision and/or a defective accommodation of the user (see FIG. 1). The interface includes at least one data communications link 118a to external device 120a. For example, external device 120a could be embodied as a smartphone and have an application using which the user is able to input context information and/or make inputs with regard to a defective vision and/or a defective accommodation of the user.

Optical system 68a is designed to generate a spatial image segmentation of the sub-image data 14a. In the spatial image segmentation, the sub-image data 14a are separated into (possibly modified) images of the image content/image data 12a that are spatially separate from one another. Each segment then includes precisely one (complete but possibly modified) image of the image content/image data 12a.

For the generation of the spatial segmentation of sub-image data 14a, optical system 68a includes at least one optical segmentation unit 126a having at least one optical segmentation element 32a. Optical segmentation element 32a is disposed between projector unit 16a, in particular refraction device 92a of projector unit 16a, and deflection unit 20a. With the aid of optical segmentation element 32a, the image content is projectable via different imaging paths 28a, 30a onto the at least one projection area 34a of deflection unit 20a.

Image processing device 10a is designed to generate from image data 12a of the image source sub-image data 14a that allow for a synchronous projection of N×M sub-images 98a, 100a having essentially the same image content. Optical segmentation element 32a is provided to perform a spatial segmentation of sub-image data 14a so that essentially the same image content of the N×M sub-images 98a, 100a is projected onto projection area 34a of deflection unit 20a via at least two different imaging paths 28a, 30a of the individually actuable imaging paths 28a, 30a. Image processing device 10a is designed to switch individual ones of imaging paths 28a, 30a to active in that sub-image data 14a for corresponding sub-image 98a, 100a are made available for the actuation of projector unit 16a. Image processing device 10a is designed to switch off individual imaging paths 28a, 30a in that sub-image data 14a are blanked for corresponding sub-images 98a, 100a.

Optical segmentation element 32a in optical system 68a shown in FIG. 2 by way of example is developed as a segmented lens, in particular as a segmenting lens. Alternatively, optical segmentation element 32a may also be embodied as a segmenting mirror (not shown), as a segmenting optical grating (not shown), as a volume hologram (not shown), or as a beam splitter (not shown). Optical segmentation element 32a includes a plurality of individual segments 36a, 38a, in particular individual lenses. One of sub-images 98a, 100a (imaging identical copies or modified/distorted versions of the image content/image data 12a in each case) is projected through each of individual segments 36a, 38a. This creates for each sub-image 98a, 100a a separate virtual refraction device (virtual MEMS mirror) 102a, 104a which is disposed separately from further virtual refraction devices (virtual MEMS mirrors) 102a, 104a and from real refraction device 92a. In particular, virtual refraction devices (virtual MEMS mirrors) 102a, 104a may (theoretically) be developed as point sources. It would be conceivable that virtual refraction devices (virtual MEMS mirrors) 102a, 104a do not form point sources but particularly only quasi-point sources or astigmatic sources, i.e., especially if optical segmentation element 32a generates a specific angle correction for each deflection angle of refraction device 92a so that all light beams 18a extended backwards by optical segmentation element 32a meet merely approximately in a common virtual source. In this case, the virtual MEMS mirrors 102a, 104a are developed especially as clouds of point sources or especially as astigmatic sources. Each sub-image 98a, 100a is thereby irradiated via a different imaging path 28a, 30a, in particular from a different angle and from a different distance onto projection area 34a of deflection unit 20a.

Optical segmentation unit 126a is designed to project a first subset of sub-images 98a, 100a with a first scan direction onto the deflection unit and to project a second subset of sub-images 98a, 100a with a second scan direction counter to the first scan direction onto deflection unit 20a, so that the beam divergence of the light beam is continuously variable with the aid of adaptive optical element 116a as a function of the angle of incidence of the light beam on deflection unit 20a.

In the present exemplary embodiment, the optical function of projecting the first subset of sub-images 98a, 100a with the first scan direction onto deflection unit 20a and of projecting a second subset of sub-images 98a, 100a with a second scan direction counter to the first scan direction onto deflection unit 20a is integrated into the at least one segmentation element 32a. As an alternative, it would be conceivable that optical segmentation unit 126a includes at least one further optical element (not shown) in addition to optical segmentation element 32a.

It would be conceivable that the optical function of projecting the first subset of sub-images 98a, 100a with the first scan direction onto deflection unit 20a and of projecting a second subset of sub-images 98a, 100a with a second scan direction counter to the first scan direction onto deflection unit 20a is integrated into the at least one further optical element (not shown) of optical segmentation unit 126a. The at least one further optical element (not shown) of optical segmentation unit 126a could be connected upstream and/or downstream from the at least one segmentation element 32a in the optical path.

Figure 3:
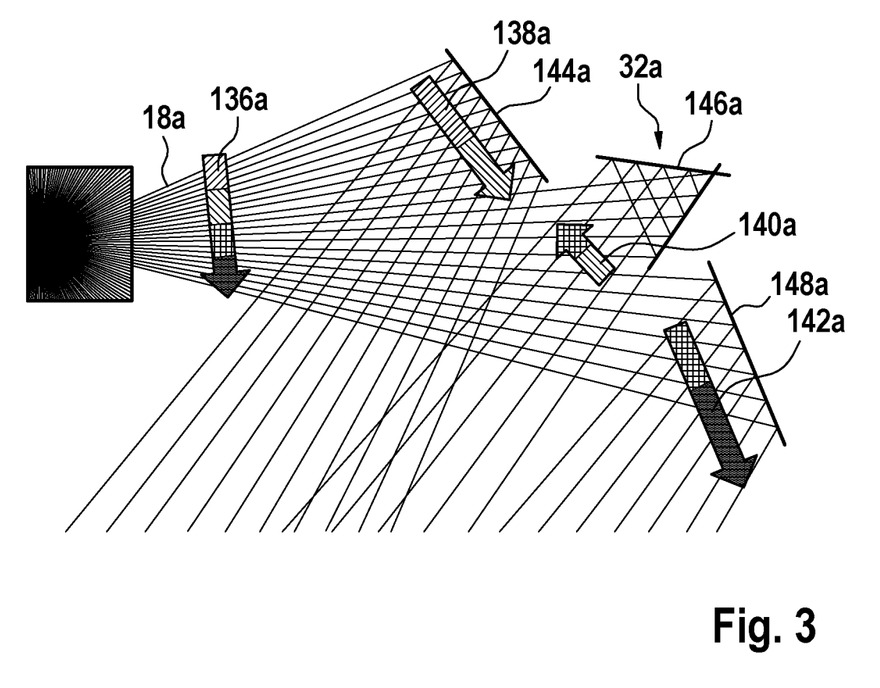
FIG. 3 shows schematically, a reversal of a scan direction of a light beam with the aid of an optical scan direction reversal element, in accordance with an example embodiment of the present invention.

FIG. 3 schematically shows a method of functioning of a reversal of the scan direction with the aid of optical segmentation element 32a of optical segmentation unit 126a. Shown on the left side of FIG. 3 is the output of a scan line of light beam 18a, which is developed as a scanned laser beam, from projector unit 16a. The scanned output laser beam is scanned in an output direction 136a. In the right part of FIG. 3, three reflection elements 144a, 146a, 148a of optical segmentation element 32a are schematically shown by way of example, which deflect the scanned laser beams and which may be developed as individual segments of an optical segmentation element 32a embodied as a segmented mirror. Middle reflection element 146a is designed to sectionally reverse the scan direction 136a after the refraction of the scanned laser beam (see arrows 138a, 140a, 142a in FIG. 3). The same principle of the scan direction reversal is also implementable using refractive, diffractive or holographic optical elements, for instance.

While projector unit 16a and optical segmentation unit 126a in the representation of FIG. 1 are situated on glasses frame 122a by way of example and deflection unit 20a is situated in the region of a lens 72a of the glasses, especially integrated into at least lens 72a, it is alternatively also conceivable that at least the image source together with image processing device 10a is disposed in external device 120a and that sub-image data 14a are transmitted from external device 120a to projector unit 16a of smart glasses 66a.

Figure 4:
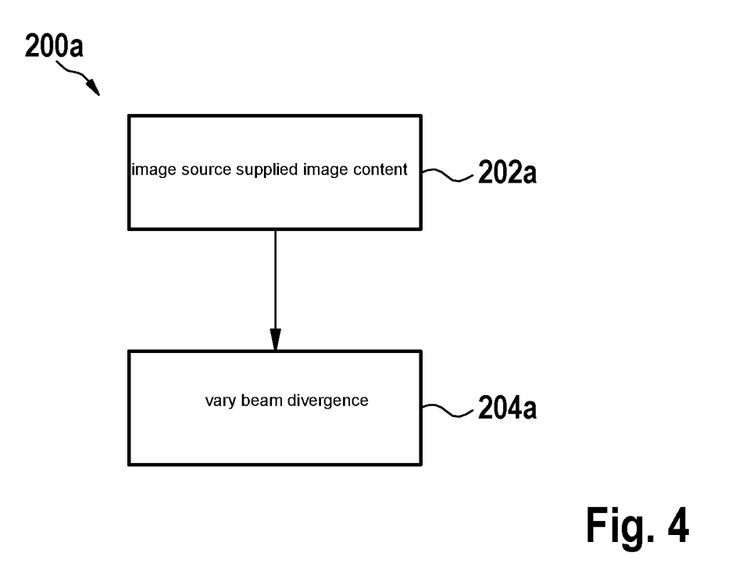
FIG. 4 shows schematically, a flow diagram of a method for projecting image contents onto the retina of a user with the aid of an optical system, in accordance with an example embodiment of the present invention.

FIG. 4 schematically shows a flow diagram of a method 200a for projecting image contents onto the retina of a user with the aid of an optical system, which at least includes
  a. an image source which supplies an image content in the form of image data 12a in at least a method step 202a,
  b. an image processing device 10a for image data 12a,
  c. a projector unit 16a having a light source 132a able to be modulated in time for generating at least one light beam, and having an actuable refraction device 92a for the at least one light beam for the scanning projection of the image content, d. a deflection unit 20a onto which the image content is projected and which guides the projected image content onto an eye of a user, e. an actuable adaptive optical element 116a for modifying the beam divergence, which is disposed in the optical path of the light beam between light source 132a and deflection unit 20a.

In at least a method step 204a, a beam divergence of the light beam is varied with the aid of actuable adaptive optical element 116a as a function of the angle of incidence of the light beam on deflection unit 20a.

In method step 204a, adaptive optical element 116a is synchronized with refraction device 92a of projector unit 16a so that the beam divergence of the light beam is varied as a function of the refraction of the light beam, in particular as a function of the horizontal refraction of the light beam.

In addition, in method step 204a, information pertaining to an eye state of the user and/or context information is determined and adaptive optical element 116a is actuated in such a way that the current eye state of the user and/or the currently determined context information are taken into account in the variation of the beam divergence of the light beam.

Figure 5:
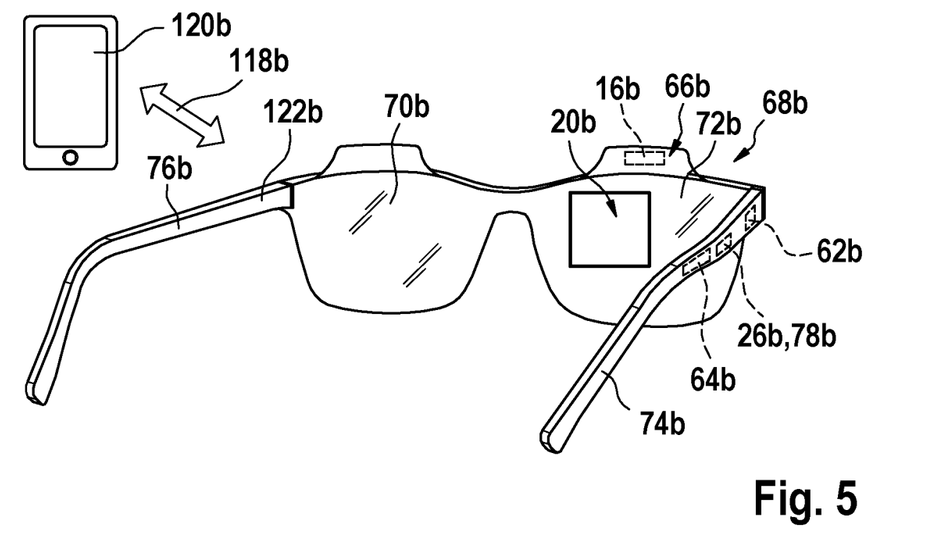
FIG. 5 shows smart glasses of an optical system of a further exemplary embodiment of the present invention.

FIG. 5 shows a further exemplary embodiment of the present invention. The following descriptions and the drawings essentially are restricted to the differences between the exemplary embodiments; as far as identically denoted components are concerned, in particular with regard to components bearing the same reference numerals, reference may basically also be made to the drawings and/or the description of the other exemplary embodiment, in particular of FIGS. 1 through 4. To distinguish the exemplary embodiments, the letter a has been appended to the reference numerals of the exemplary embodiment in FIGS. 1 through 4. In the exemplary embodiment of FIG. 5, the letter a has been replaced by the letter b.

By way of example, FIG. 5 shows in a schematic representation a further conceivable embodiment of smart glasses 66b of an optical system 68b of a further exemplary embodiment of the present invention. Smart glasses 66b could be embodied as gaming glasses, for instance. Smart glasses 66b have a frame 122b with side pieces 74b, 76b. Smart glasses 66b have lenses 70b, 72b. Smart glasses 66b form part of optical system 68b. Optical system 68b in the case shown in FIG. 5 includes an external device 120b. External device 120b is embodied as a smartphone by way of example. External device 120b is in a data communications connection 118b with smart glasses 66b. As an alternative, smart glasses 66b may also form entire optical system 68b. Optical system 68b is provided to form a virtual retinal scan display. In the example shown in FIG. 5, smart glasses 66b have a processing unit 78b. Processing unit 78b is integrated into one of side pieces 74b, 76b of the smart glasses. Alternative placements of processing unit 78b in smart glasses 66b, e.g., in a lens edge of the smart glasses, are likewise conceivable.

Optical system 68b has an image source (not shown) which supplies an image content in the form of image data. In addition, optical system 68b includes an image processing device (not shown) for the image data. Optical system 68b moreover includes a projector unit 16b having a light source able to be modulated in time for generating at least one light beam, and an actuable refraction device (not shown) for the at least one light beam for the scanning projection of the image content. In addition, optical system 68b includes a deflection unit 20b onto which the image content is able to be projected and which is designed to guide the projected image content onto an eye (not shown) of a user. Optical system 68b furthermore includes an adaptive optical element (not shown) for modifying a beam divergence, which is situated in the optical path of the light beam between the light source and deflection unit 20b. The adaptive optical element is able to be actuated in such a way that the beam divergence of the light beam is variable as a function of the angle of incidence of the light beam on deflection unit 20b.

Projector unit 16b is situated above deflection unit 20b. The refraction device of projector unit 16b is designed to refract the light beam more slowly in the vertical direction than in the horizontal direction so that the image content is projected in a line-wise manner, and the adaptive optical element is synchronized with the vertical refraction of the light beam.

What is claimed is:

1. An optical system for a virtual retinal scan display, comprising:
   a. an image source configured to supply an image content in the form of image data;
   b. an image processing device for the image data;
   c. a projector unit having a light source able to be modulated in time for generating at least one light beam, and having an actuable refraction device for the at least one light beam for a scanning projection of the image content;
   d. a deflection unit onto which the image content is able to be projected and which is configured to guide the projected image content onto an eye of a user; and
   e. an adaptive optical element configured to modify a beam divergence, which is situated in an optical path of the light beam between the light source and the deflection unit, wherein the adaptive optical element is able to be actuated so that a beam divergence of the light beam is variable as a function of an angle of incidence of the light beam on the deflection unit,
   wherein the image processing device configured to generate, from the image data of the image source, sub-image data which allow for a simultaneous projection of N×M sub-images having essentially the same image content.

2. The optical system as recited in claim 1, wherein the adaptive optical element is able to be synchronized with the refraction device of the projector unit so that the beam divergence of the light beam is variable as a function of refraction of the light beam.

3. The optical system as recited in claim 1, wherein the refraction device of the projector unit is configured to refract the light beam more slowly in a horizontal direction than in a vertical direction so that the image content is projected in a column-wise manner, and the adaptive optical element is synchronized with a horizontal refraction of the light beam.

4. The optical system as recited in claim 1, wherein the refraction device of the projector unit is configured to refract the light beam more slowly in a vertical direction than in a horizontal direction so that the image content is projected in a line-wise manner, and the adaptive optical element is synchronized with a vertical refraction of the light beam.

5. The optical system as recited in claim 1, further comprising:
   an eye tracker device configured to acquire and/or determine an eye state of the user, the eye tracker device configured to acquire and/or determine an eye movement and/or an eye movement rate and/or a pupil position and/or a pupil size and/or a viewing direction and/or an accommodation state and/or a fixation distance of the eye, and the adaptive optical element is actuable in such a way that a current eye state of the user is taken into account in the variation of the beam divergence of the light beam.

6. The optical system as recited in claim 1, further comprising:
at least one sensor module configured for determining context information, the content information including a head posture and/or a head orientation and/or a head movement of the user and/or an environment brightness and light conditions and/or a location and/or a movement situation of the user, and the adaptive optical element is actuable in such a way that currently determined context information is taken into account in the variation of the beam divergence of the light beam.

7. The optical system as recited in claim 6, wherein the adaptive optical element is actuable in such a way that a defective vision and/or a defective accommodation of the user is taken into account in the variation of the beam divergence of the light beam and at least partially compensated.

8. The optical system as recited in claim 7, further comprising:
at least one interface configured for manual input of context information and/or information pertaining to a defective vision and/or a defective accommodation of the user.

9. An optical system for a virtual retinal scan display, comprising:
a. an image source configured to supply an image content in the form of image data;
b. an image processing device for the image data;
c. a projector unit having a light source able to be modulated in time for generating at least one light beam, and having an actuable refraction device for the at least one light beam for a scanning projection of the image content;
d. a deflection unit onto which the image content is able to be projected and which is configured to guide the projected image content onto an eye of a user; and
e. an adaptive optical element configured to modify a beam divergence, which is situated in an optical path of the light beam between the light source and the deflection unit, wherein the adaptive optical element is able to be actuated so that a beam divergence of the light beam is variable as a function of an angle of incidence of the light beam on the deflection unit,
wherein the image processing device configured to generate, from the image data of the image source, sub-image data which allow for a simultaneous projection of N×M sub-images having essentially the same image content, wherein an optical segmentation unit having at least one segmentation element is situated between the projector unit and the deflection unit, which performs a spatial segmentation in that the essentially same image content of the N×M sub images is projected onto the deflection unit via at least two different imaging paths, and the optical segmentation unit is configured to project a first subset of the N×M sub-images with a first scan direction onto the deflection unit, and to project a second subset of the N×M sub-images with a second scan direction counter to the first scan direction onto the deflection unit, so that the beam divergence of the light beam is continuously variable using the adaptive optical element as a function of an angle of incidence of the light beam on the deflection unit.

10. The optical system as recited in claim 9, wherein the optical function of projecting the first subset of the N×M sub-images with the first scan direction onto the deflection unit and of projecting the second subset of the N×M sub-images with the second scan direction counter to the first scan direction onto the deflection unit is integrated into the at least one segmentation element and/or into at least one optical element that is connected upstream and/or downstream from the at least one segmentation element in the optical path.

11. The optical system as recited in claim 1, further comprising:
smart glasses having a frame and lenses,
wherein the at least one projector unit is situated on the frame of the smart glasses, and the at least one deflection unit is situated in a region of at least one lens of the smart glasses.

12. The optical system as recited in claim 11, wherein the at least one deflection unit is integrated into the at least one lens of the smart glasses.

13. A method for projecting image contents onto a retina of a user using an optical system, the method comprising the following steps:
supplying, by an image source, an image content in the form of image data;
processing the image data using an image processing device;
generating, using a projector unit having a light source able to be modulated in time for, at least one light beam, and scanning, using an actuable refraction device, the at least one light beam for a scanning projection of the image content;
receiving, on a deflection unit, the projected image content, and guiding, by the deflection unit, the projected image content onto an eye of a user; and
modifying, by an actuable adaptive optical element which is situated in an optical path of the light beam between the light source and the deflection unit, the beam divergence, which is situated in the optical path of the light beam between the light source and the deflection unit;
wherein a beam divergence of the light beam is varied using the actuable adaptive optical element as a function of an angle of incidence of the light beam on the deflection unit,
wherein the image processing device configured to generate, from the image data of the image source, sub-image data which allow for a simultaneous projection of N×M sub-images having essentially the same image content.

14. The method as recited in claim 13, wherein the adaptive optical element is synchronized with the refraction device of the projector unit so that the beam divergence of the light beam is varied as a function of the refraction of the light beam.

15. The method as recited in claim 13, wherein the beam divergence of the light beam is varied as a function of a horizontal refraction of the light beam.

16. The method as recited in claim 13, wherein information pertaining to an eye state of the user and/or context information is determined, and the adaptive optical element is actuated in such a way that a current eye state of the user and/or a currently determined context information is taken into account in the variation of the beam divergence of the light beam.

\* \* \* \* \*